(12) United States Patent
Babin

(10) Patent No.: US 6,830,447 B2
(45) Date of Patent: Dec. 14, 2004

(54) VALVE GATE ASSEMBLY FOR INJECTION MOLDING

(75) Inventor: Denis Babin, Georgetown (CA)

(73) Assignee: Mold-Masters Limited (CA)

( * ) Notice: Subject to any disclaimer, the term of this patent is extended or adjusted under 35 U.S.C. 154(b) by 0 days.

(21) Appl. No.: 09/944,109

(22) Filed: Sep. 4, 2001

(65) Prior Publication Data

US 2002/0028266 A1 Mar. 7, 2002

(30) Foreign Application Priority Data

Sep. 6, 2000 (CA) .............................................. 2317779

(51) Int. Cl.$^7$ ................................................ B29C 45/23
(52) U.S. Cl. ..................... 425/564; 264/328.9; 425/566
(58) Field of Search ................................. 425/549, 562, 425/563, 564, 565, 566; 264/328.9, 328.15

(56) References Cited

U.S. PATENT DOCUMENTS

| | | | |
|---|---|---|---|
| 4,053,271 A | 10/1977 | Gellert | |
| 4,212,627 A | 7/1980 | Gellert | |
| 4,330,258 A | * 5/1982 | Gellert | ........................ 425/564 |
| 4,340,353 A | 7/1982 | Mayer | |
| 4,368,028 A | 1/1983 | Grish et al. | |
| 4,394,117 A | 7/1983 | Taylor | |
| 4,530,654 A | 7/1985 | Rose | |
| 5,324,190 A | 6/1994 | Frei | |
| 5,423,672 A | 6/1995 | Gordon | |
| 5,443,381 A | 8/1995 | Gellert | |
| 5,460,763 A | * 10/1995 | Asai | ........................ 264/328.9 |
| 5,695,793 A | * 12/1997 | Bauer | ........................ 425/564 |
| 5,783,234 A | 7/1998 | Teng | |
| 5,785,915 A | 7/1998 | Osuna-Diaz | |
| 5,840,231 A | 11/1998 | Teng | |
| 5,916,605 A | 6/1999 | Swenson et al. | |
| 5,948,450 A | 9/1999 | Swenson et al. | |
| 5,984,661 A | 11/1999 | Vorkoeper | |
| 6,086,357 A | 7/2000 | Steil et al. | |
| 6,113,381 A | 9/2000 | Gellert et al. | |
| 6,159,000 A | 12/2000 | Puri et al. | |

FOREIGN PATENT DOCUMENTS

| | | | |
|---|---|---|---|
| JP | 10-16005 A | | 1/1998 |
| WO | WO 99/46108 | * | 9/1999 |

* cited by examiner

*Primary Examiner*—Tim Heitbrink
(74) *Attorney, Agent, or Firm*—Sterne, Kessler, Goldstein & Fox P.L.L.C.

(57) ABSTRACT

A valve pin assembly for an injection molding apparatus comprising a valve pin capable of movement up and down in a nozzle to open and close a ring gate. An annular passage is created through the nozzle and is unobstructed and without restriction at all points up to and through the ring gate, permitting melt to flow freely to the gate and, depending on the position of the valve pin, into the mold cavity. The valve pin has a head with a diameter larger than the valve pin shaft for selectively closing the gate. The ring gate channel diameter is larger than the melt channel diameter to permit parts with large apertures therein to be formed.

43 Claims, 6 Drawing Sheets

VALVE GATE ASSEMBLY FOR INJECTION MOLDING

FIELD OF THE INVENTION

This invention relates generally to the injection molding of articles with an aperture therein and, more particularly, to an improved gating apparatus for injection molding articles having large apertures.

BACKGROUND

Injection molding can be used advantageously to mold plastic articles of all shapes and description. Among such articles are those having an aperture therethrough, typically centrally located, such as in an audio compact disc or a lamp shade, or the like. Various apparatus are known in the art for accomplishing the molding of such articles, as shown in U.S. Pat. No. 4,368,028 to Grish et al., U.S. Pat. No. 4,530,654 to Rose and U.S. Pat. No. 5,423,672 to Gordon and Japanese Patent No. JP10-16005, each of which is incorporated herein by reference. These references disclose an injection molding apparatus having a nozzle with a central valve pin therein, creating an annular passage for melt to flow therearound to a gated tip. The valve pin permits the flow of melt to be positively selectively controlled and, when extended from the nozzle, also causes an annular ring 'gate' form between the pin and the nozzle tip, thereby permitting an annular article to be formed having a central aperture therethrough.

The apparatus of Grish et al., Rose, Gordon and/or JP10-16005, however, do not facilitate the forming of plastic articles having a large diameter aperture (such as a lamp shade), primarily for several reasons. Firstly, if the inner bore of the nozzle is enlarged to facilitate molding a larger diameter aperture, a greater volume of melt will remain in the nozzle after each cycle, thereby increasing the risk of melt degradation in the nozzle and increasing the difficulty in controlling the overall temperature of the melt. Also, guiding the valve pin can become a problem. U.S. Pat. No. 4,340,353 to Mayer, incorporated herein by reference, teaches a plurality of radially outwardly and angularly spaced extending arms 76, 78 used to guide a valve stem 74. These arms, however, together with flow opening 89, represent obstructions to the incoming flow of molten resin, toward the mold cavity, which generate several melt or flow lines in the finished product, decreasing the overall attractiveness of the product.

A possible solution to the problem of reducing melt volume in the nozzle is to increase the pin diameter correspondingly to reduce the overall volume of melt in the nozzle. If the pin diameter is so increased, however, the melt is exposed to an increased overall surface area in the nozzle which results in increased pressure losses in the runner system.

Another solution is posed by U.S. Pat. No. 5,785,915 to Osuna-Diaz, incorporated herein by reference, which discloses a nozzle having an outwardly flared bore and an outwardly flared insert that define between them a flared cylindrical melt passage. A valve sleeve surrounding the nozzle controls melt flow through an annular gate at the nozzle tip. This arrangement, too, would appear to suffer from the drawback of melt exposure to an enlarged surface area and resulting pressure losses in the runner system.

The prior art also proposes splitting or otherwise distributing the melt prior to delivery to the gate and injection into the mold cavity. For example, U.S. Pat. No. 5,324,190 to Frei, incorporated herein by reference, discloses the use of a plurality of borings 19 through the nozzle which break up the flow in the resin, as do the spacers 17. Similarly, U.S. Pat. No. 5,460,763 to Asai, also incorporated herein by reference, discloses a plurality of passages 21 for distributing the flow in the nozzle. In U.S. Pat. No. 4,394,117 to Taylor, incorporated herein by reference, though a central valve pin is not used, this reference does disclose a resin passage 55 which terminates in a conical dispersion head 66 mounted on its lower portion and a sleeve valve 30 fitted and slidably cooperating to selectively prevent the molten material from flowing into the mold cavity.

The devices of Frei, Asai and Taylor, however, can also result in the appearance of flow lines in the final product. To combat this problem, U.S. Pat. Nos. 5,783,234 and 5,840,231, both to Teng and incorporated herein by reference, disclose an even more complex apparatus to recombine the individual streams of molten resin after they are split and prior to entering the cavity gate, so as to minimize the appearance of flow lines. The apparatuses of Frei, Asai, Taylor and Teng, however, all require careful machining and make a resin colour change a laborious and time consuming proposition, as the intricate surfaces must be carefully cleaned before a new colour resin can be introduced.

Therefore it is desirable to provide an apparatus which permits improved control of the flow plastic melt from a hot runner system to a plurality of cavities to achieve more uniformity of formed articles. It is also desirable to avoid restrictions to or interferences with melt flow through the nozzle to permit the cavity to be filled with a uniform melt and receive a high quality product particularly for articles with large apertures therethrough.

SUMMARY OF THE INVENTION

In one aspect, the present invention provides an injection molding apparatus for forming articles having a hole, comprising:

at least one mold cavity formed between a cavity plate and an adjacent core;

at least one injection molding nozzle having an annular gate, the nozzle connectable to a source of molten material and capable of feeding molten material from the source to the gate through at least one melt channel through the nozzle, the gate communicating with the mold cavity and having a cross-section that is wider than the cross-section of the melt channel;

a valve pin disposed interior of the melt channel and the gate, the valve pin defining an unrestricted melt flow passage through the melt channel around and along the valve pin, the valve pin moveable between a closed position in which the valve pin substantially contacts the gate sufficiently to stop the flow of molten material through the gate, and an open position in which molten material can flow unrestricted to the gate.

In a second aspect, the present invention provides an injection molding apparatus for forming articles having a hole, comprising:

at least one mold cavity formed between a cavity plate and an adjacent core;

at least one injection molding nozzle having an annular gate, the nozzle connectable to a source of molten material and capable of feeding molten material from the source to the gate through at least one melt channel through the nozzle, the gate communicating with the mold cavity and having a cross-section that is wider than the cross-section of the melt channel;

a valve pin disposed interior of the melt channel and the gate, the valve pin defining an unobstructed melt flow passage through the melt channel around and along the valve pin, the valve pin moveable between a closed position in which the valve pin substantially contacts the gate sufficiently to stop the flow of molten material through the gate, and an open position in which molten material can flow unobstructed to the gate.

In a third aspect, the present invention provides an injection molding apparatus for forming articles having a hole, comprising:

a mold having a cavity plate and an adjacent core which enclose a mold cavity therebetween;

an injection molding nozzle having a melt channel therethrough, the melt channel communicating with the mold cavity through an annular gate at the tip of the nozzle;

a valve pin disposed interior of the melt channel, the valve pin and the melt channel defining a melt flow passage around and along the valve pin, the valve pin having a head portion adjacent the nozzle tip and a stem portion remote from the nozzle tip, the head portion having a wider cross-section than the stem portion; and an actuator operatively linked to the stem portion of the valve pin to move the valve pin between an open position with its head portion adjacent the gate in which molten material can flow through the gate into the mold cavity, and a closed position with its head portion blocking the gate to seal the communication between the nozzle and the mold cavity.

In a fourth aspect, the present invention provides an injection molding system for forming articles having a hole, comprising:

a mold cavity plate and a plurality of mold cores defining with the mold cavity plate a plurality of mold cavities;

a melt distribution manifold for delivering molten material to the mold cavities;

a plurality of injection molding nozzles respectively associated with the mold cavities, each nozzle having a melt channel therethrough, the melt channel communicating with its respective mold cavity through an annular gate at the tip of the nozzle;

each of the nozzles having a valve pin disposed interior of the melt channel, the valve pin and the melt channel defining a melt flow passage around and along the valve pin, the valve pin having a head portion adjacent the nozzle tip and a stem portion remote from the nozzle tip, the head portion having a wider cross-section than the stem portion; and actuating means operatively linked to the stem portion of each of the valve pins to move each valve pin between an open position with its head portion adjacent the gate in which molten material can flow through the gate into the mold cavity, and a closed position with its head portion blocking the gate to seal the communication between the nozzle and the mold cavity.

The valve pin preferably has a smooth transition portion between the stem portion and the head portion. The distal end of the head portion may have a guide portion which engages the core for guiding the valve pin between its open and closed positions. A core sleeve may be provided for engaging the perimeter of the head portion of the valve pin. Further, the perimeter of the head portion of the valve pin may form part of the surface of the core when the valve pin is in its closed position to at least partly define and form the hole.

The shape of the annular gate (and the parts that form the gate) may be chosen to form a hole of any desired shape in the articles to be molded. Thus, e.g., the gate cross-section may be circular, oval, square, rectangular, or irregular.

BRIEF DESCRIPTION OF THE DRAWINGS

For a better understanding of the present invention, and to show more clearly how it may be carried into effect, reference will now be made by way of example to the accompanying drawings. The drawings show articles made according to a preferred embodiment of the present invention, in which.

DETAILED DESCRIPTION

Figure 1:
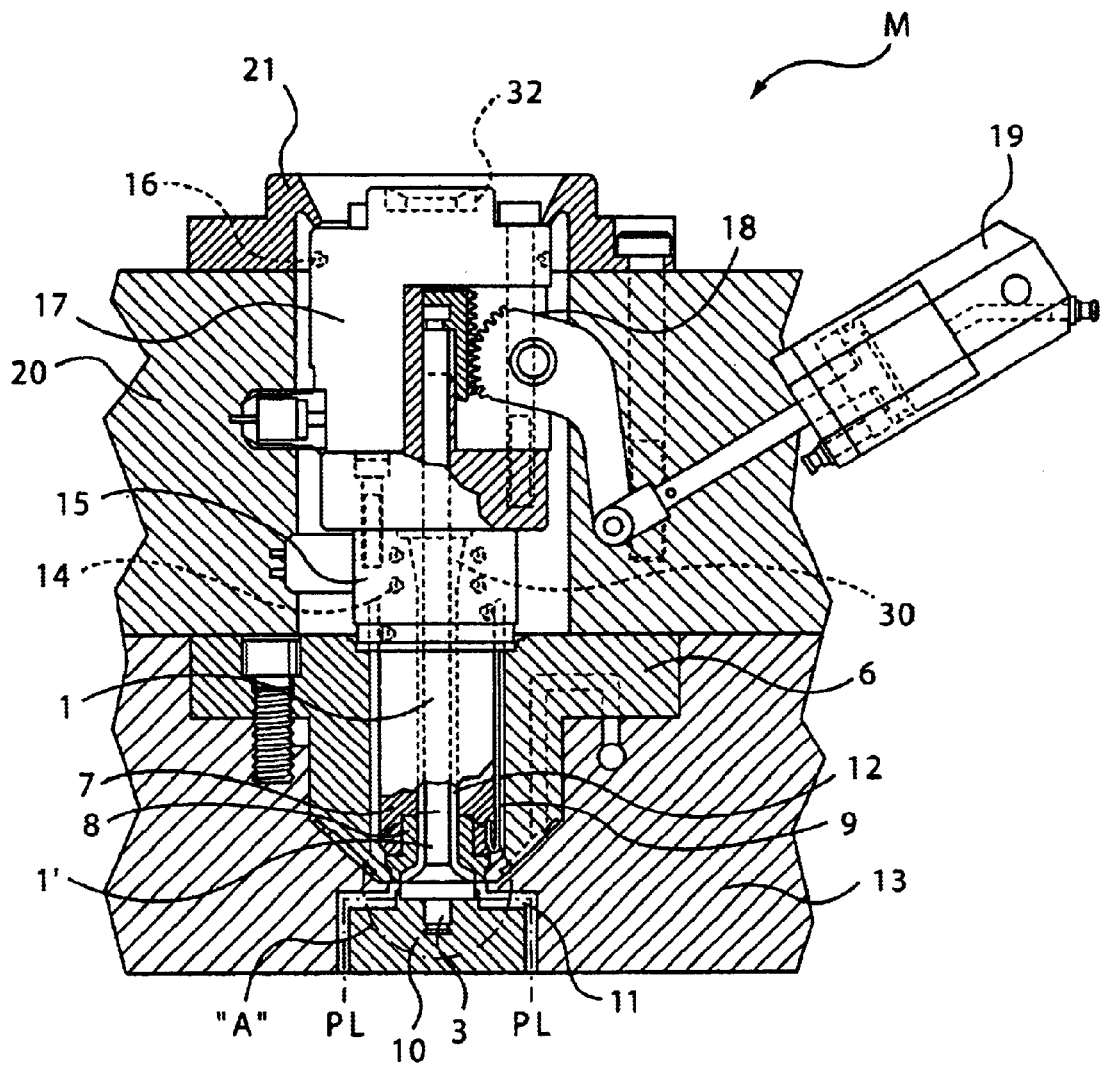
FIG. 1 is a sectional side view of an injection molding apparatus according to the present invention.

An injection molding apparatus according to the present invention is shown generally in the Figures at M. Apparatus M comprises a nozzle mold plate 20 and a cavity plate 13 cooperating with a mold core 10 along a parting line PL to form a mold cavity 11 therebetween. An injection molding machine (not shown) has an injection nozzle (not shown) which communicates with a heated runner system 30 via a sprue bushing 32 to provide molten plastic therethrough, under pressure. A locating ring 21 is provided to position the molding machine. Runner system 30 communicates through an inlet sleeve or body 17 with a melt channel 12 centrally located in an injection nozzle 7. Injection nozzle 7 has a nozzle head 15 and is positioned in a nozzle plate 6 positioned substantially in cavity plate 13. Runner system 30 is maintained at a desired operating temperature by inlet body heater elements 16, nozzle heater elements 14 and a thermocouple 9 communicating with a suitable control system (not shown), as is well known in the art. Centrally disposed in melt channel 12 of nozzle 7 is a valve pin 1 which is axially movable in nozzle 7, for reasons described in more detail below, by the cooperation of an activating cylinder 19 (which may be pneumatic or hydraulic, as is well known in the art), and a rack and pinion motion transfer gear train 18.

Figure 2:
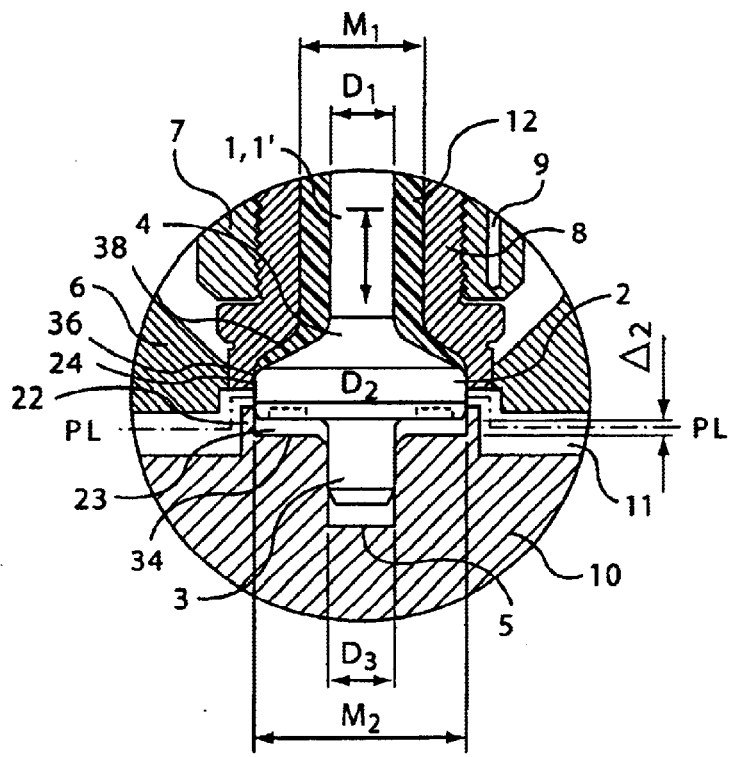
FIG. 2 is an enlarged partial view of the apparatus of FIG. 1 at circle A, the apparatus being shown in the "closed" position.

Referring to FIG. 2, valve pin 1 has a stem 1', a neck 4, a plate or head 2 and a guiding lug or spigot 3. A removable nozzle tip 8 and a nozzle plate 6 cooperate with neck 4 and head 2 to selectively connect melt channel 12 with mold cavity 11 depending on the position of valve pin 1, as will be described in more detail below. A spigot notch or bore 5 is provided in core 10 for receiving and guiding valve spigot 3. Spigot bore 5 has a shoulder 34 for receiving valve head 2, and a core sleeve space 23 is present between shoulder 34 and head 2 when valve pin 1 is in any position other than the "open" position, as will be described below. A core sleeve 22 surrounds core sleeve space 23 to prevent melt from penetrating therein.

Nozzle tip 8 has an enlarged opening 36 in the mold end thereof which cooperates with valve pin 1 to create a nozzle tip gate 24 therebetween. Melt channel 12 communicates with opening 36 via a substantially smooth transition zone 38.

Valve pin 1, valve stem 1', valve head 2, melt channel 12, transition 38 and opening 36 are substantially circular in cross-section so as to define an annular melt passage (between valve pin 1 and nozzle 7) and give gate 24 an annular entry into mold cavity 11. Valve stem 1' has an outside diameter $D_1$ and head 2 has an outside diameter $D_2$, while melt channel 12 has a diameter of $M_1$ and opening 36 has an inside diameter $M_2$. As can be seen from FIG. 2, head 2 diameter $D_2$ is slightly less than opening 36 diameter $M_2$ to permit head 2 to be inserted into opening 36 to close gate 24, as will be described in more detail below.

When in the "closed" position, as shown in FIG. 2, head 2 is positioned so as to substantially contact tip 8 at opening 36 to close gate 24. Pressurized melt in runner system 30 is thus prevented from entering mold cavity 11. In this position, core sleeve space 23 has a height of $\Delta_2$, as shown, and part of the outer annular surface of head 2 forms part of the core surface that will shape the hole in the molded part.

Figure 3:
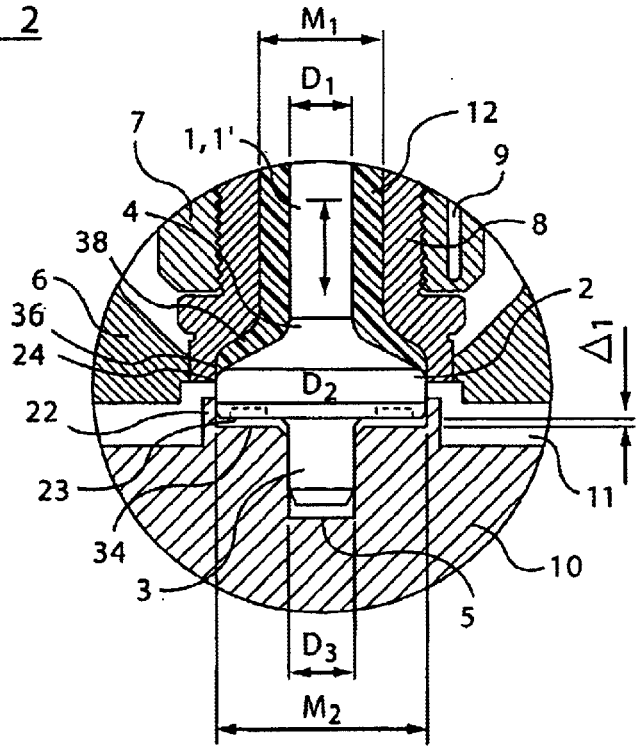
FIG. 3 is an enlarged view similar to FIG. 2, showing the apparatus in an intermediate position.

Referring again to FIG. 1, as will be understood by one skilled in the art, cylinder 19 may be selectively actuated and controlled by an appropriate system (not shown) to activate rack and pinion gear 18 to effect an axial movement of valve pin 1 within nozzle 7. From the "closed" position (FIG. 2), cylinder 19, when driven, advances valve pin 1 axially in nozzle 7 through an intermediate position (FIG. 3) to a fully "open" position (FIG. 4).

Figure 4:
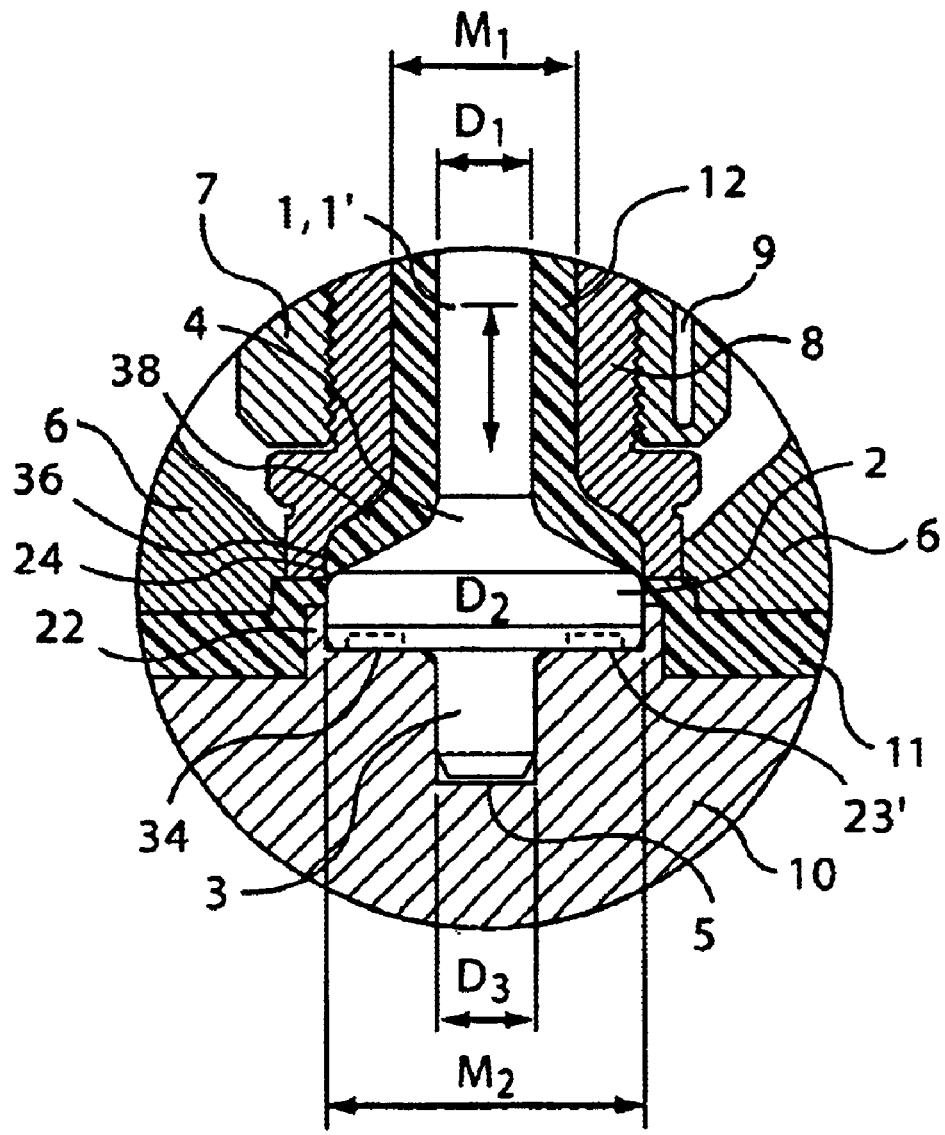
FIG. 4 is an enlarged view similar to FIG. 2, showing the apparatus in the "open" position.

Referring to FIG. 4, when valve pin 1 is in the "open" position, valve pin 1 has moved axially away from nozzle tip 8, so that gate 24 is opened between head 2 and opening 36. Gate 24 thus provides a passage for heated melt to pass from melt channel 12 in nozzle 7 and into cavity 11, in response to pressure from the injection molding machine (not shown). In the intermediate position (FIG. 3), core sleeve space 23 has a height of $\Delta_1$, but in the fully "open" position, there is essentially no core sleeve space at 23' (see FIG. 4).

Referring to FIGS. 1 and 4, it will be apparent that runner system 30 is annular, unobstructed and continuous throughout melt channel 12, gate 24 and ultimately mold cavity 11. The melt flow path around and along valve pin 1 is unrestricted substantially up to the gate 24, i.e., the cross-sectional area of this portion of the melt flow path does not appreciably diminish substantially up to the gate. Thus there is a simple flow path through which melt may freely flow when the gate 24 is open. This free-flow is advantageous because it assists in reducing pressure losses in the system and permits resin colour changes to be achieved more quickly in the apparatus.

Figure 5:
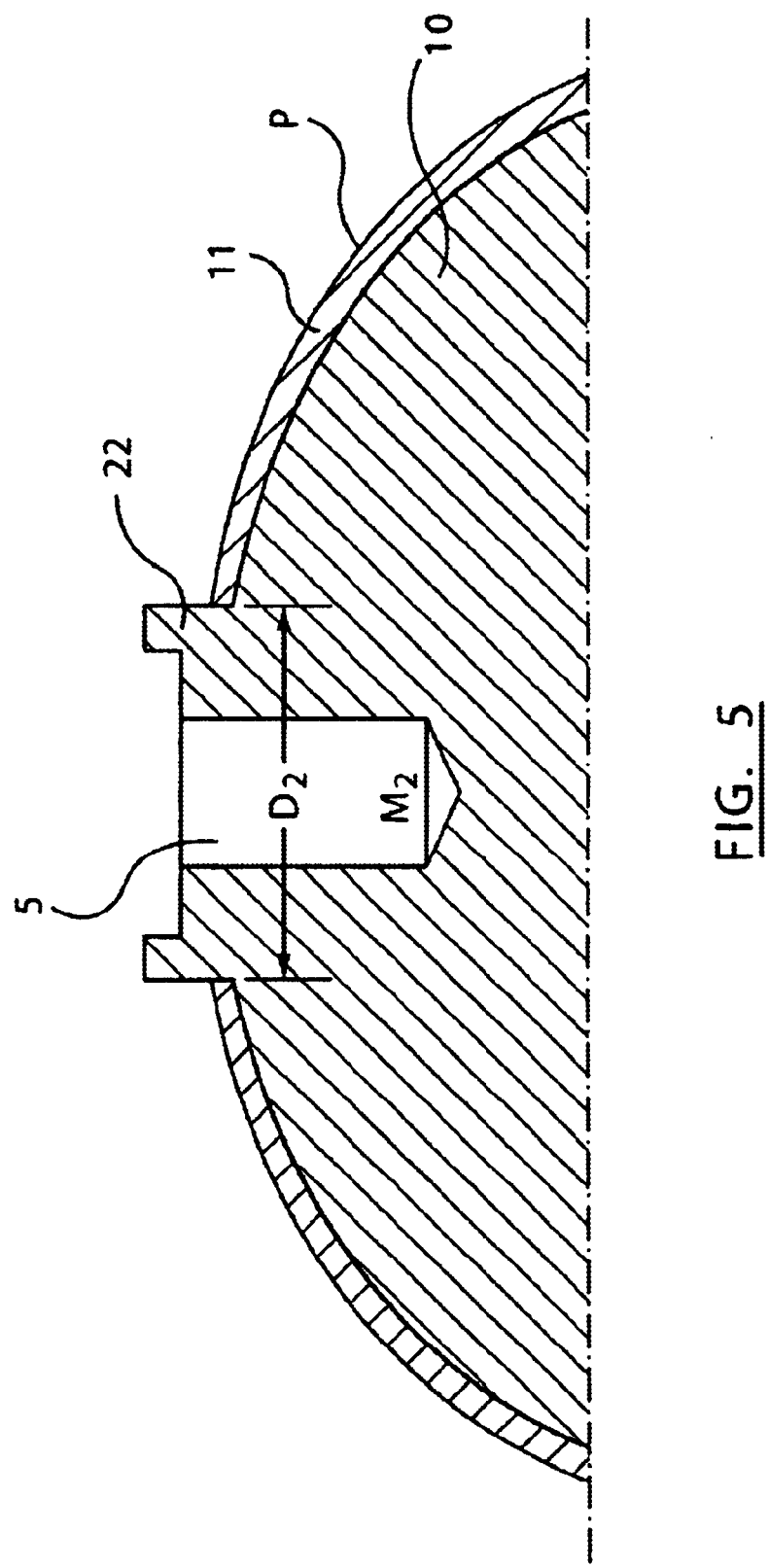
FIG. 5 is a sectional side view of a core and molded article, namely a lamp shade, in accordance with the present invention.

The enlarged opening 36 and the cooperation of transition zone 38 and valve neck 4 advantageously permit a larger aperture ring gate 24 to be achieved than is possible with the prior art and without the need for the spreading or distribution means of the prior art, such as those shown variously in U.S. Pat. No. 4,340,353 to Mayer, U.S. Pat. No. 5,324,190 to Frei, U.S. Pat. No. 5,460,763 to Asai, U.S. Pat. No. 4,394,117 to Taylor, U.S. Pat. No. 5,783,234 to Teng and U.S. Pat. No. 5,840,231 to Teng, each of which is incorporated herein by reference. None of these references teaches the use of a transition 38 and enlarged opening 36 to permit a relatively small diameter melt channel 12 to provide melt to a larger aperture part P, as is shown in FIG. 5, while permitting the melt to flow freely, in an unrestricted manner, into the cavity, thereby permitting improved part quality.

Diameter $M_2$ of opening 36 is chosen according to the particular application, as will be understood by one skilled in the art, and will be larger than diameter $M_1$ of melt bore 12 in order to achieve the benefit of an ability to mold larger aperture parts according to the present invention. As shown in the Figures, a diameter $M_2$ that is much larger than $M_1$ is preferred, and a diameter $M_2$ of roughly the diameter of tip 8, or greater, is yet more preferable.

One skilled in the art will understand that other modifications are possible. For example, the use of a guide spigot 3 is desirable but not necessary. Further, the actuation of valve pin 1 and its movement from the "open" to "closed" positions may be achieved by other known means. See, e.g., U.S. Pat. No. 4,053,271 to Gellert; U.S. Pat. No. 5,916,605 to Swenson; U.S. Pat. No. 5,948,450 to Swenson; U.S. Pat. No. 5,984,661 to Vorkoper; U.S. Pat. No. 6,159,000 to Puri; and U.S. Pat. No. 6,086,357 to Steil, all of which are incorporated herein by reference.

One skilled in the art will understand that the present invention may be applied to single- or multi-cavity injection molds. For multi-cavity applications, melt typically flows through one or more melt distribution manifolds and is injected into each cavity through a respective nozzle, the valve pins of the nozzles being actuated simultaneously, as is well-known in the art. See, e.g., the camming mechanisms disclosed in U.S. Pat. No. 4,212,627 to Gellert, and U.S. Pat. No. 6,113,381 to Gellert, both of which are incorporated herein by reference.

Figure 6:
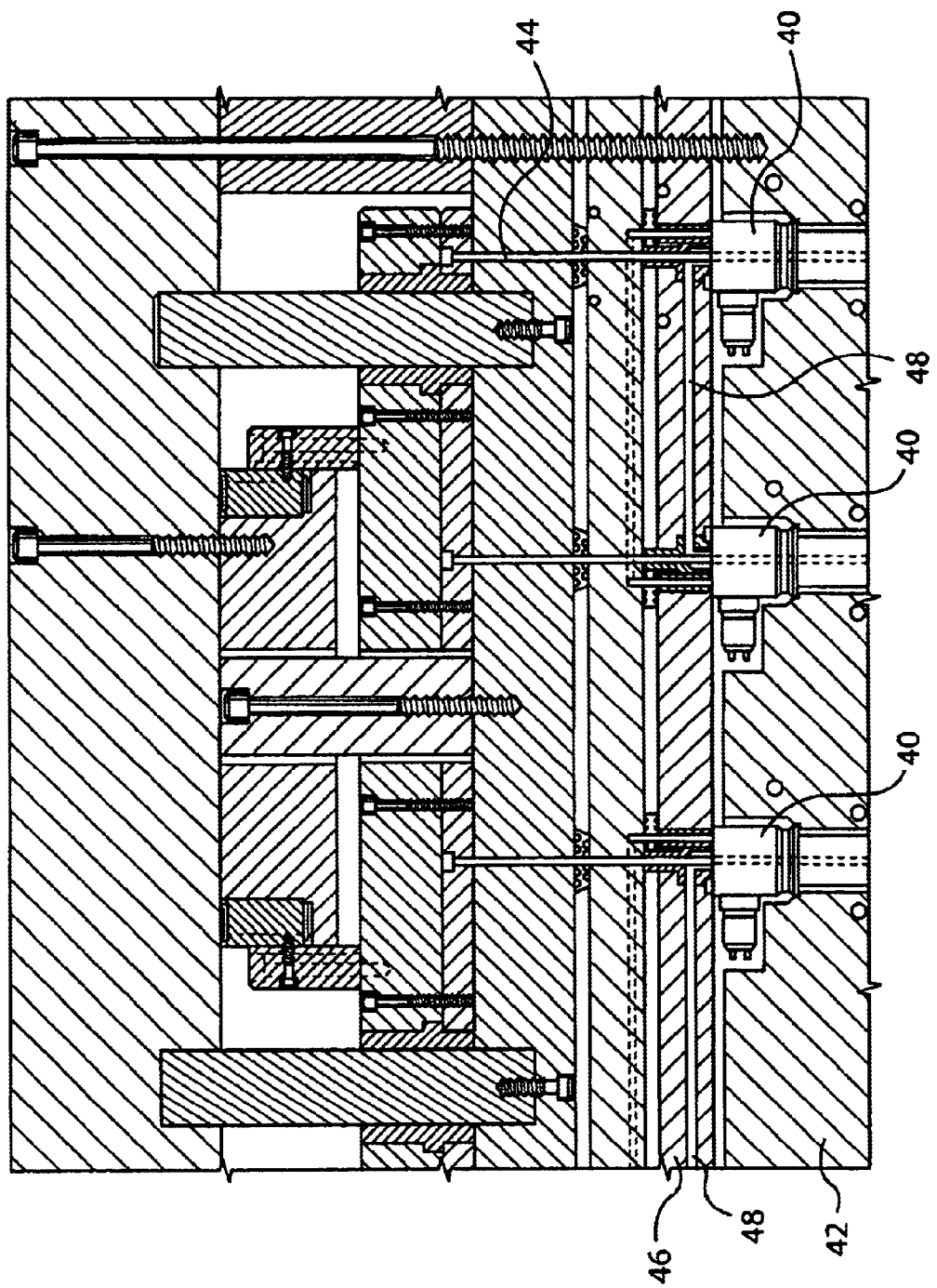
FIG. 6 is a partial sectional view of a multi-cavity injection molding apparatus according to the invention.

For example, FIG. 6 shows the multi-cavity arrangement with common valve pin actuating mechanism of the latter patent in which nozzles according to the invention can be used. In this arrangement multiple nozzles 40 are seated in a retainer plate 42 and have commonly actuated valve pins 44. A melt distribution manifold 46 feeds melt to the nozzles via melt passages 48.

Figure 7:
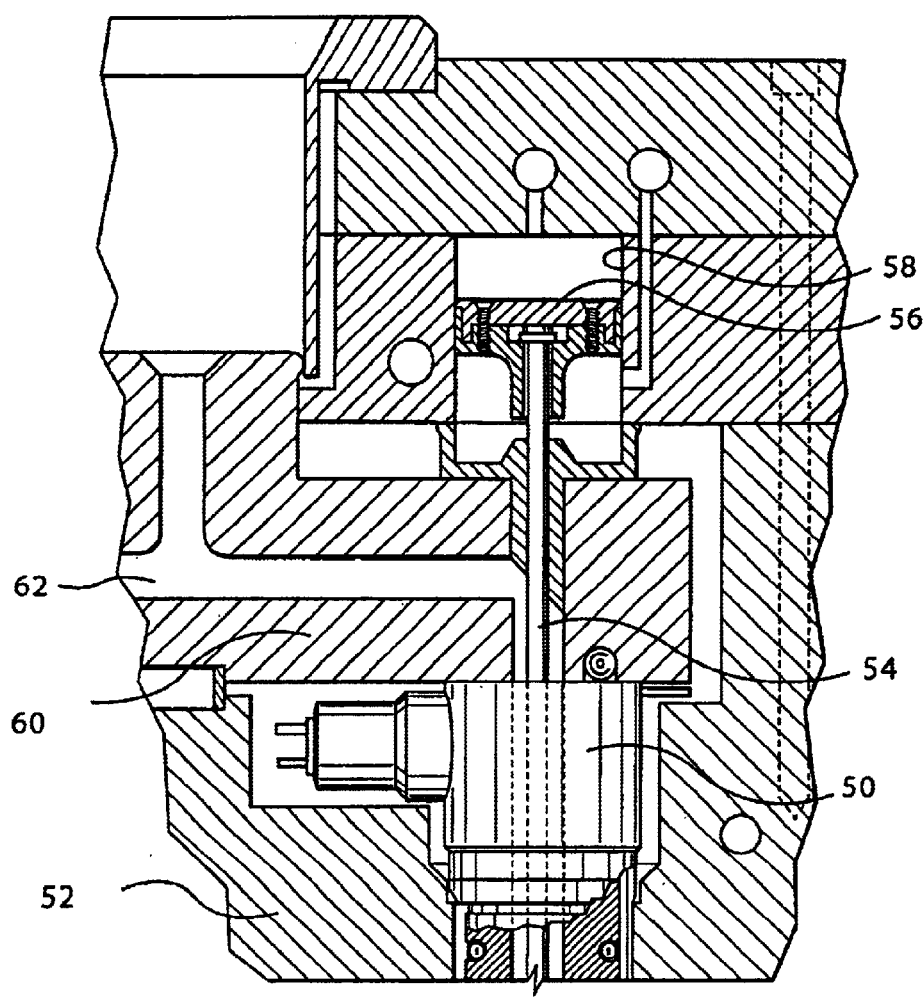
FIG. 7 is a partial sectional view of another multi-cavity injection molding apparatus according to the invention.

Fluid actuators that act directly on the valve pins can be used in a multi-cavity arrangement, and these can be driven simultaneously or separately. U.S. Pat. No. 5,443,381 to Gellert (incorporated herein by reference) discloses such an arrangement. FIG. 7 shows the fluid drive disclosed in this patent, which can be used in conjunction with nozzles according to the invention. Here each nozzle 50 is seated in a plate 52 and has a valve pin 54 actuated by a fluid-driven piston 56 that reciprocates within a cylinder 58. The piston and cylinder drive 56, 58 are coaxial with the valve pin 54. Melt is fed to each nozzle laterally from a melt distribution manifold 60 via melt passages 62.

Figure 8:
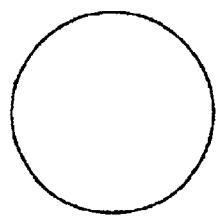
FIG. 8 is a plan view of a circular hole that can be molded into a product using apparatus according to the invention.
Figure 9:
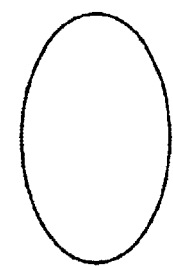
FIG. 9 is a plan view of an oval hole that can be molded into a product using apparatus according to the invention.
Figure 10:
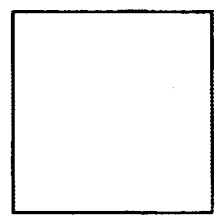
FIG. 10 is a plan view of a square hole that can be molded into a product using apparatus according to the invention.
Figure 11:
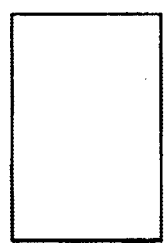
FIG. 11 is a plan view of a rectangular hole that can be molded into a product using apparatus according to the invention.
Figure 12:
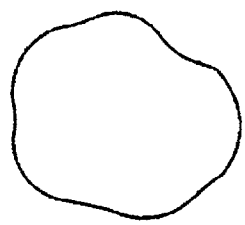
FIG. 12 is a plan view of an irregular hole that can be molded into a product using apparatus according to the invention.

As noted above in connection with the embodiment of FIGS. 1–4, valve head 2, surrounding opening 36 and core sleeve 22 have circular cross-sections and form a ring-shaped gate 24, resulting in a molded part that has a circular hole as shown in FIG. 8. It is to be understood that apparatus according to the invention can be used to make parts having large holes of any other regular shape, e.g., oval (FIG. 9), square (FIG. 10), rectangular (FIG. 11), etc., or holes of any irregular shape (see, e.g., FIG. 12), by using mating parts of selected shape. Thus, as used in the claims, the term "annular" as applied to the gate and the mating parts that define the gate are not limited to circular shapes, and can encompass virtually any closed shape.

While the above description includes the preferred embodiment, it will be appreciated that the present invention is susceptible to further modification and change without parting from the fair meaning of the proper scope of the accompanying claims.

Canadian priority application No. 2,317,779, filed Sep. 6, 2000, is incorporated herein by reference in its entirety.

I claim:

1. An injection molding apparatus for forming articles having a hole, comprising:
   at least one mold cavity formed between a cavity plate and an adjacent core;
   at least one injection molding nozzle having an annular gate, said at least one injection molding nozzle connectable to a source of molten material and capable of feeding molten material from said source to said at least one mold cavity through said melt channel and said annular gate; and
   a valve pin disposed within said melt channel defining a melt flow passage through said nozzle around and along said valve pin, said valve pin moveable between a closed position in which a head portion of said valve pin substantially contacts said gate sufficiently to stop the flow of molten material through said gate, and an open position in which molten material can flow unrestricted to said gate,
   wherein the head portion of said valve pin includes a front surface facing said core and two side surfaces,
   wherein said core includes a core sleeve for engaging said side surfaces of the head portion of said valve pin.

2. Apparatus according to claim 1, wherein the head portion of said valve pin has a guide portion which engages said core for guiding said valve pin between said closed position and said open position.

3. Apparatus according to claim 2, wherein said gate cross-section is substantially circular.

4. Apparatus according to claim 2, wherein said gate cross-section is non-circular.

5. Apparatus according to claim 2, wherein said gate cross-section is irregular.

6. Apparatus according to claim 1, wherein said gate cross-section is substantially circular.

7. Apparatus according to claim 1, wherein said gate cross-section is non-circular.

8. Apparatus according to claim 1, wherein said gate cross-section is irregular.

9. Apparatus according to claim 1, wherein said at least one nozzle includes a nozzle tip which is separable from said at least one nozzle, said gate being located in said nozzle tip.

10. An injection molding apparatus for forming articles having a hole, comprising:
    at least one mold cavity formed between a cavity plate and an adjacent core;
    at least one injection molding nozzle including a nozzle tip which is separable from said nozzle, said at least one injection molding nozzle having a melt channel and an annular gate located in said nozzle tip, said at least one injection molding nozzle connectable to a source of molten material and capable of feeding molten material from said source to said at least one mold cavity through said melt channel and said annular gate; and
    a valve pin disposed within said melt channel and defining an unobstructed melt flow passage through said nozzle around and along said valve pin, said valve pin moveable between a closed position in which a head portion of said valve pin substantially contacts said gate sufficiently to stop the flow of molten material through said gate, and an open position in which molten material can flow unrestricted to said gate,
    wherein the cross-section of the gate is wider than the cross-section of the melt channel through said nozzle.

11. Apparatus according to claim 10, wherein said core includes a core sleeve for engaging said valve pin.

12. Apparatus according to claim 11, wherein said core sleeve engages sides of said valve pin.

13. Apparatus according to claim 12, wherein the head portion of said valve pin has a guide portion which engages said core for guiding said valve pin between said closed position and said open position.

14. Apparatus according to claim 10, wherein the head portion of said valve pin has a guide portion which engages said core for guiding said valve pin between said closed position and said open position.

15. Apparatus according to claim 14, wherein said gate cross-section is substantially circular.

16. Apparatus according to claim 14, wherein said gate cross-section is non-circular.

17. Apparatus according to claim 14, wherein said gate cross-section is irregular.

18. Apparatus according to claim 10, wherein said gate cross-section is substantially circular.

19. Apparatus according to claim 10, wherein said gate cross-section is non-circular.

20. Apparatus according to claim 10, wherein said gate cross-section is irregular.

21. An injection molding apparatus for forming articles having a hole, comprising:
    a mold having a cavity plate and an adjacent core which enclose a mold cavity therebetween;
    an injection molding nozzle having a melt channel therethrough, said melt channel communicating with the mold cavity through an annular gate at the tip of the nozzle;
    a valve pin disposed within said melt channel, said valve pin and said melt channel defining a melt flow passage around and along the valve pin, said valve pin having a head portion adjacent the nozzle tip and a stem portion remote from the nozzle tip, the head portion having a wider cross-section than the stem portion; and
    an actuator operatively linked to the stem portion of said valve pin to move said valve pin between an open position with its head portion adjacent the gate in which molten material can flow through the gate into the mold cavity, and a closed position with its head portion blocking the gate to seal the communication between the nozzle and the mold cavity,
    wherein the cross-section of the gate is wider than the cross-section of the melt channel through said nozzle.

22. Apparatus according to claim 21, wherein the head portion of the valve pin has a wider cross-section than the melt channel.

23. Apparatus according to claim 22, wherein the valve pin has a smooth transition portion between its head portion and its stem portion.

24. Apparatus according to claim 23, wherein the head portion of the valve pin has a guide portion which engages said core for guiding the valve pin between said open position and said closed position.

25. Apparatus according to claim 24, wherein said gate cross-section is substantially circular.

26. Apparatus according to claim 24, wherein said gate cross-section is non-circular.

27. Apparatus according to claim 24, wherein said gate cross-section is irregular.

28. Apparatus according to claim 21, wherein the valve pin has a smooth transition portion between its head portion and its stem portion.

29. Apparatus according to claim 28, wherein the head portion of the valve pin has a guide portion which engages said core for guiding the valve pin between said open position and said closed position.

30. Apparatus according to claim 22, wherein the peripheral surface of the head portion of the valve pin forms part of the surface of said core when the valve pin is in its closed position to at least partly define and form the hole.

31. Apparatus according to claim 30, wherein the head portion of the valve pin has a guide portion which engages said core for guiding the valve pin between said open position and said closed position.

32. Apparatus according to claim 21, wherein the peripheral surface of the head portion of the valve pin forms part of the surface of said core when the valve pin is in its closed position to at least partly define and form the hole.

33. Apparatus according to claim 32, wherein the head portion of the valve pin has a guide portion which engages said core for guiding the valve pin between said open position and said closed position.

34. Apparatus according to claim 33, wherein the valve pin has a smooth transition portion between its head portion and its stem portion.

35. Apparatus according to claim 21, including a removable nozzle seal surrounding the head portion of the valve pin, the nozzle seal sealing and guiding the head portion during at least a portion of valve pin movement between said open and closed positions.

36. An injection molding system for forming articles having a hole, comprising:

a mold cavity plate and a plurality of mold cores defining with said mold cavity plate a plurality of mold cavities;

a melt distribution manifold for delivering molten material to said mold cavities;

a plurality of injection molding nozzles respectively associated with said mold cavities, each nozzle having a melt channel therethrough, said melt channel communicating with its respective mold cavity through an annular gate at the tip of the nozzle, and each gate having a wider cross-section than the cross-section of its respective melt channel;

each of said nozzles having a valve pin disposed within said melt channel, said valve pin and said melt channel defining a melt flow passage around and along the valve pin, said valve pin having a head portion adjacent the nozzle tip and a stem portion remote from the nozzle tip, the head portion having a wider cross-section than the stem portion; and actuating means operatively linked to the stem portion of each of said valve pins to move each valve pin between an open position with its head portion adjacent the gate in which molten material can flow through the gate into the mold cavity, and a closed position with its head portion blocking the gate to seal the communication between the nozzle and the mold cavity.

37. A system according to claim 36, wherein the actuating means actuates all of the valve pins simultaneously.

38. Apparatus according to claim 36, wherein the peripheral surface of the head portion of each valve pin forms part of the surface of said mold core when the valve pin is in its closed position to at least partly define and form the hole.

39. Apparatus according to claim 38, wherein the head portion of each valve pin has a guide portion which engages said mold core for guiding the valve pin between said open position and said closed position.

40. Apparatus according to claim 39, wherein each valve pin has a smooth transition portion between its head portion and its stem portion.

41. Apparatus according to claim 39, including a removable nozzle seal on each nozzle surrounding the head portion of the valve pin, the nozzle seal sealing and guiding the head portion during at least a portion of valve pin movement between said open and closed positions.

42. Apparatus according to claim 36, including a removable nozzle seal on each nozzle surrounding the head portion of the valve pin, the nozzle seal sealing and guiding the head portion during at least a portion of valve pin movement between said open and closed positions.

43. Apparatus according to claim 1, wherein the cross-section of the gate is wider than the cross-section of the melt channel through said nozzle.

* * * * *